(12) United States Patent
Ding et al.

(10) Patent No.: US 9,906,913 B2
(45) Date of Patent: Feb. 27, 2018

(54) METHOD FOR PREDICTING POSITION OF MOBILE USER, AND EQUIPMENT

(71) Applicant: Huawei Technologies Co., Ltd., Shenzhen (CN)

(72) Inventors: Qiang Ding, Beijing (CN); Chen Yu, Wuhan (CN); Li Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/139,556

(22) Filed: Apr. 27, 2016

(65) Prior Publication Data
US 2016/0242009 A1    Aug. 18, 2016

Related U.S. Application Data

(63) Continuation of application No. PCT/CN2014/088464, filed on Oct. 13, 2014.

(30) Foreign Application Priority Data

Oct. 28, 2013  (CN) .......................... 2013 1 0518476

(51) Int. Cl.
*H04W 4/02*    (2009.01)
*G06N 7/00*    (2006.01)

(52) U.S. Cl.
CPC ............ *H04W 4/028* (2013.01); *G06N 7/005* (2013.01)

(58) Field of Classification Search
CPC ......... H04W 4/028; H04W 4/02; H04M 1/66; G06N 7/005; G06N 7/00; G06F 17/50
See application file for complete search history.

(56) References Cited

U.S. PATENT DOCUMENTS

2003/0022656 A1  1/2003  Hinnant et al.
2008/0208441 A1  8/2008  Cheung
(Continued)

FOREIGN PATENT DOCUMENTS

CN  101989127 A  3/2011
CN  102314474 A  1/2012
(Continued)

OTHER PUBLICATIONS

Partial English Translation and Abstract of Chinese Patent Application No. CN102509170, Oct. 13, 2016, 5 pages.
(Continued)

*Primary Examiner* — Chuong A Ngo
(74) *Attorney, Agent, or Firm* — Conley Rose, P.C.

(57) ABSTRACT

A method for predicting a position of a mobile user, and equipment are provided. The method includes determining an occurrence probability of a current behavioral activity of the mobile user; determining an occurrence probability of a target behavioral activity of the mobile user according to the occurrence probability of the current behavioral activity of the mobile user, a historical activity migration rule of the mobile user, and a public activity migration rule; determining the target behavioral activity of the mobile user according to the occurrence probability of the target behavioral activity of the mobile user; and predicting a target geographical position of the mobile user according to the determined target behavioral activity of the mobile user. The method improves usability of the target geographical position of the mobile user.

17 Claims, 2 Drawing Sheets

(56) References Cited

U.S. PATENT DOCUMENTS

| | | | |
|---|---|---|---|
| 2009/0054043 | A1 | 2/2009 | Hamilton et al. |
| 2011/0029465 | A1 | 2/2011 | Ito et al. |
| 2011/0319094 | A1 | 12/2011 | Usui et al. |
| 2012/0226554 | A1 | 9/2012 | Schmidt et al. |
| 2012/0239607 | A1 | 9/2012 | Rao et al. |
| 2013/0197890 | A1* | 8/2013 | Ide .................... G01C 21/3484 703/6 |
| 2014/0128105 | A1 | 5/2014 | Su et al. |

FOREIGN PATENT DOCUMENTS

| | | | |
|---|---|---|---|
| CN | 102509170 | A | 6/2012 |
| CN | 102682041 | A | 9/2012 |
| CN | 102984799 | A | 3/2013 |
| CN | 103052022 | A | 4/2013 |
| EP | 2642431 | A1 | 9/2013 |
| JP | 2004333136 | A | 11/2004 |
| JP | 2007183249 | A | 7/2007 |
| JP | 2008070377 | A | 3/2008 |
| JP | 2008271358 | A | 11/2008 |
| JP | 2010520454 | A | 6/2010 |
| JP | 2012108748 | A | 6/2012 |
| JP | 2012182655 | A | 9/2012 |
| JP | 2012256239 | A | 12/2012 |

OTHER PUBLICATIONS

Minh Tri Do, T., et al., "Contextual Conditional Models for Smartphone-based Human Mobility Prediction," UbiComp, Sep. 5-8, 2012, 10 pages.

Scellato, S., et al., "NextPlace: A Spatio-Temporal Prediction Framework for Pervasive Systems," Pervasive Computing, vol. 6696, 2011, 18 pages.

Foreign Communication From a Counterpart Application, European Application No. 14856995.7, Extended European Search Report dated Sep. 20, 2016, 8 pages.

Foreign Communication From a Counterpart Application, PCT Application No. PCT/CN2014/088464, English Translation of International Search Report dated Jan. 12, 2015, 2 pages.

Foreign Communication From a Counterpart Application, PCT Application No. PCT/CN2014/088464, English Translation of Written Opinion dated Jan. 12, 2015, 5 pages.

Machine Translation and Abstract of Chinese Publication No. CN103052022, Apr. 17, 2013, 14 pages.

Foreign Communication From a Counterpart Application, Chinese Application No. 201310518476.X, Chinese Office Action dated Aug. 10, 2017, 6 pages.

Machine Translation and Abstract of Japanese Publication No. JP2004333136, Nov. 25, 2004, 19 pages.

Machine Translation and Abstract of Japanese Publication No. JP2007183249, Jul. 19, 2007, 95 pages.

Machine Translation and Abstract of Japanese Publication No. JP2008070377, Mar. 27, 2008, 107 pages.

Machine Translation and Abstract of Japanese Publication No. JP2008271358, Nov. 6, 2008, 29 pages.

Machine Translation and Abstract of Japanese Publication No. JP2012182655, Sep. 20, 2012, 18 pages.

Machine Translation and Abstract of Japanese Publication No. JP2012256239, Dec. 27, 2012, 21 pages.

Foreign Communication From a Counterpart Application, Japanese Application No. 2016-526824, Japanese Office Action dated Sep. 5, 2017, 2 pages.

Foreign Communication From a Counterpart Application, Japanese Application No. 2016-526824, English Translation of Japanese Office Action dated Sep. 5, 2017, 3 pages.

Foreign Communication From a Counterpart Application, Chinese Application No. 201310518476.X, Chinese Office Action dated Dec. 15, 2017, 6 pages.

* cited by examiner

METHOD FOR PREDICTING POSITION OF MOBILE USER, AND EQUIPMENT

CROSS-REFERENCE TO RELATED APPLICATIONS

This application is a continuation of International Application No. PCT/CN2014/088464, filed on Oct. 13, 2014, which claims priority to Chinese Patent Application No. 201310518476.X, filed on Oct. 28, 2013, both of which are hereby incorporated by reference in their entireties.

TECHNICAL FIELD

Embodiments of the present disclosure relate to communications technologies, and in particular, to a method for predicting a position of a mobile user, and equipment.

BACKGROUND

With rapid development of a geographic information system, a mobile positioning technology, a wireless communications network, an intelligent terminal technology, and a sensor technology, a situational intelligence application also undergoes rapid development. In the situational intelligence application, how to predict a target geographical position of a mobile user is extremely important for openness of the situational intelligence application.

In the prior art, multiple historical geographical positions that are frequently visited by a mobile user are recorded. When a target geographical position of the mobile user is being predicted, the target geographical position of the mobile user is selected from the multiple historical geographical positions according to a preset prediction model.

However, at an initial stage of prediction, due to a lack of sufficient information about historical geographical positions, selection of the target geographical position of the mobile user may be greatly limited, which leads to a low accuracy of the target geographical position of the mobile user.

SUMMARY

Embodiments of the present disclosure provide a method for predicting a position of a mobile user, and equipment in order to improve accuracy of a target geographical position of a mobile user.

According to a first aspect, the present disclosure provides a method for predicting a position of a mobile user, including determining an occurrence probability of a current behavioral activity of a mobile user, determining an occurrence probability of a target behavioral activity of the mobile user according to the occurrence probability of the current behavioral activity of the mobile user, a historical activity migration rule of the mobile user, and a public activity migration rule, determining the target behavioral activity of the mobile user according to the occurrence probability of the target behavioral activity of the mobile user, and predicting a target geographical position of the mobile user according to the determined target behavioral activity of the mobile user.

With reference to the first aspect, in a first possible implementation manner of the first aspect, the historical activity migration rule includes an occurrence probability, determined according to a historical behavioral activity of the mobile user, that the mobile user is converted from the current behavioral activity to the target behavioral activity, and a weighting factor of the historical behavioral activity, and the public activity migration rule includes an occurrence probability, determined according to a historical behavioral activity of another mobile user, that the mobile user is converted from the current behavioral activity to the target behavioral activity, and a weighting factor of a public behavioral activity.

With reference to the first possible implementation manner of the first aspect, in a second possible implementation manner of the first aspect, the determining an occurrence probability of a target behavioral activity of the mobile user according to the occurrence probability of the current behavioral activity of the mobile user, a historical activity migration rule of the mobile user, and a public activity migration rule includes determining an occurrence probability of a target behavioral activity corresponding to the historical behavioral activity according to the occurrence probability of the current behavioral activity, the occurrence probability, determined according to the historical behavioral activity of the mobile user, that the mobile user is converted from the current behavioral activity to the target behavioral activity, and the weighting factor of the historical behavioral activity, determining an occurrence probability of a target behavioral activity corresponding to the public behavioral activity according to the occurrence probability of the current behavioral activity, the occurrence probability, determined according to the historical behavioral activity of the other mobile user, that the mobile user is converted from the current behavioral activity to the target behavioral activity, and the weighting factor of the public behavioral activity, and determining the occurrence probability of the target behavioral activity of the mobile user according to the occurrence probability of the target behavioral activity corresponding to the historical behavioral activity and the occurrence probability of the target behavioral activity corresponding to the public behavioral activity.

With reference to the first aspect, in a third possible implementation manner of the first aspect, the predicting a target geographical position of the mobile user according to the determined target behavioral activity of the mobile user includes determining whether the target behavioral activity of the mobile user exists in a historical behavioral activity record of the mobile user, where the historical behavioral activity record includes a historical geographical position corresponding to the target behavioral activity, if the target behavioral activity of the mobile user exists in the historical behavioral activity record of the mobile user, predicting the target geographical position of the mobile user according to the historical behavioral activity record, and if the target behavioral activity of the mobile user does not exist in the historical behavioral activity record of the mobile user, predicting the target geographical position of the mobile user according to a geographical position that is within a first preset geographical position range and corresponding to the target behavioral activity.

With reference to the first aspect or any one of the first to the third possible implementation manners of the first aspect, in a fourth possible implementation manner of the first aspect, the determining an occurrence probability of a current behavioral activity of the mobile user includes acquiring a current geographical position and current time of the mobile user, determining, according to the current geographical position, distribution of a point of interest that is of the mobile user and within a second preset geographical position range, and determining the occurrence probability of the current behavioral activity of the mobile user according to the current time and the distribution of the point of interest, or acquiring sense data corresponding to the mobile user, determining a motion state of the mobile user according to the sense data, and determining the occurrence probability of the current behavioral activity of the mobile user according to the motion state of the mobile user, or acquiring a background voice of a current geographical position of the mobile user, and determining the occurrence probability of the current behavioral activity of the mobile user according to the background voice.

With reference to the fourth possible implementation manner of the first aspect, in a fifth possible implementation manner of the first aspect, there is a correspondence between the current time, each of the point of interest, and an occurrence sub-probability of the current behavioral activity, and the determining the occurrence probability of the current behavioral activity of the mobile user according to the current time and the distribution of the point of interest includes determining a ratio of each of the point of interest according to the distribution of the point of interest, and determining the occurrence probability of the current behavioral activity of the mobile user at the current time according to the ratio of each of the point of interest, and an occurrence sub-probability of the current behavioral activity corresponding to each of the point of interest.

According to a second aspect, the present disclosure provides user equipment, including a first probability determining module configured to determine an occurrence probability of a current behavioral activity of a mobile user, a second probability determining module configured to determine an occurrence probability of a target behavioral activity of the mobile user according to the occurrence probability of the current behavioral activity of the mobile user, a historical activity migration rule of the mobile user, and a public activity migration rule, a behavioral activity determining module configured to determine the target behavioral activity of the mobile user according to the occurrence probability of the target behavioral activity of the mobile user, and a predicting module configured to predict a target geographical position of the mobile user according to the determined target behavioral activity of the mobile user.

With reference to the second aspect, in a first possible implementation manner of the second aspect, the historical activity migration rule includes an occurrence probability, determined according to a historical behavioral activity of the mobile user, that the mobile user is converted from the current behavioral activity to the target behavioral activity, and a weighting factor of the historical behavioral activity, and the public activity migration rule includes an occurrence probability, determined according to a historical behavioral activity of another mobile user, that the mobile user is converted from the current behavioral activity to the target behavioral activity, and a weighting factor of a public behavioral activity.

With reference to the first possible implementation manner of the second aspect, in a second possible implementation manner of the second aspect, the second probability determining module is configured to determine an occurrence probability of a target behavioral activity corresponding to the historical behavioral activity according to the occurrence probability of the current behavioral activity, the occurrence probability, determined according to the historical behavioral activity of the mobile user, that the mobile user is converted from the current behavioral activity to the target behavioral activity, and the weighting factor of the historical behavioral activity, determine an occurrence probability of a target behavioral activity corresponding to the public behavioral activity according to the occurrence probability of the current behavioral activity, the occurrence probability, determined according to the historical behavioral activity of the other mobile user, that the mobile user is converted from the current behavioral activity to the target behavioral activity, and the weighting factor of the public behavioral activity, and determine the occurrence probability of the target behavioral activity of the mobile user according to the occurrence probability of the target behavioral activity corresponding to the historical behavioral activity and the occurrence probability of the target behavioral activity corresponding to the public behavioral activity.

With reference to the second aspect, in a third possible implementation manner of the second aspect, the predicting module is configured to determine whether the target behavioral activity of the mobile user exists in a historical behavioral activity record of the mobile user, where the historical behavioral activity record includes a historical geographical position corresponding to the target behavioral activity, if the target behavioral activity of the mobile user exists in the historical behavioral activity record of the mobile user, predict the target geographical position of the mobile user according to the historical behavioral activity record, and if the target behavioral activity of the mobile user does not exist in the historical behavioral activity record of the mobile user, predict the target geographical position of the mobile user according to a geographical position that is within a first preset geographical position range and corresponding to the target behavioral activity.

With reference to the second aspect or any one of the first to the third possible implementation manners of the second aspect, in a fourth possible implementation manner of the second aspect, the first probability determining module is configured to acquire a current geographical position and current time of the mobile user, determine, according to the current geographical position, distribution of a point of interest that is of the mobile user and within a second preset geographical position range, and determine the occurrence probability of the current behavioral activity of the mobile user according to the current time and the distribution of the point of interest, or acquire sense data corresponding to the mobile user, determine a motion state of the mobile user according to the sense data, and determine the occurrence probability of the current behavioral activity of the mobile user according to the motion state of the mobile user, or acquire a background voice of a current geographical position of the mobile user, and determine the occurrence probability of the current behavioral activity of the mobile user according to the background voice.

With reference to the fourth possible implementation manner of the second aspect, in a fifth possible implementation manner of the second aspect, there is a correspondence between the current time, each of the point of interest, and an occurrence sub-probability of the current behavioral activity, and the first probability determining module is further configured to determine a ratio of each of the point of interest according to the distribution of the point of interest, and determine the occurrence probability of the current behavioral activity of the mobile user at the current time according to the ratio of each of the point of interest, and an occurrence sub-probability of the current behavioral activity corresponding to each of the point of interest.

According to the method for predicting a position of a mobile user, and the equipment provided in the embodiments of the present disclosure, user equipment determines an occurrence probability of a current behavioral activity of a mobile user, determines an occurrence probability of a target behavioral activity of the mobile user according to the occurrence probability of the current behavioral activity of the mobile user, a historical activity migration rule of the mobile user, and a public activity migration rule, determines the target behavioral activity of the mobile user according to the occurrence probability of the target behavioral activity of the mobile user, and predicts a target geographical position of the mobile user according to the determined target behavioral activity of the mobile user. In the present disclosure, in a case in which there is no large number of historical activity migration rules of the mobile user, the target geographical position of the mobile user is determined using the public activity migration rule, which improves accuracy of the target geographical position. In addition, in the embodiments, a geographical position that does not appear in the historical activity migration rule of the mobile user may further be predicted using the public activity migration rule in order to obtain the target geographical position, thereby improving universal applicability of the method for predicting a position of a mobile user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
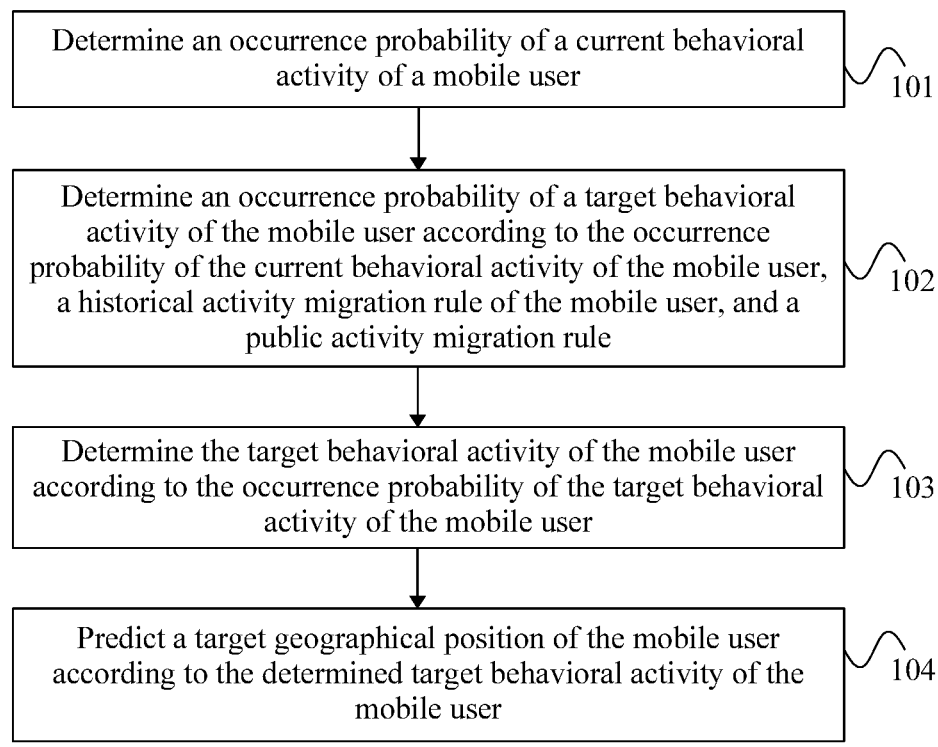
FIG. 1 is a schematic flowchart of Embodiment 1 of a method for predicting a position of a mobile user according to the present disclosure.

FIG. 1 is a schematic flowchart of Embodiment 1 of a method for predicting a position of a mobile user according to the present disclosure. The method for predicting a position of a mobile user provided in this embodiment may be implemented using user equipment, where the user equipment may be implemented using software and/or hardware. As shown in FIG. 1, the method for predicting a position of a mobile user provided in this embodiment includes the following steps:

Step 101: Determine an occurrence probability of a current behavioral activity of a mobile user.

Step 102: Determine an occurrence probability of a target behavioral activity of the mobile user according to the occurrence probability of the current behavioral activity of the mobile user, a historical activity migration rule of the mobile user, and a public activity migration rule.

Step 103: Determine the target behavioral activity of the mobile user according to the occurrence probability of the target behavioral activity of the mobile user.

Step 104: Predict a target geographical position of the mobile user according to the determined target behavioral activity of the mobile user.

In a specific implementation process, the user equipment determines the target geographical position of the mobile user, where the target geographical position refers to a destination that the mobile user may need to go next when being located in a current geographical position. For example, when the target geographical position of the mobile user is predicted as a frequently visited shopping center, information about discounts and sales promotion of a shop may be pushed to the mobile user in advance, which saves time of the user and also improves user experience, or when the target geographical position of the mobile user is known as home, the mobile user is reminded to buy flour on the way back from work, and turn on an air conditioner at home by means of remote control, and in addition, traffic status of road sections are sent to the user equipment.

A person skilled in the art may understand that the foregoing embodiment describes only some application processes of the target geographical position of the mobile user, but not all application processes, and for other application processes of the target geographical position of the mobile user, details are not described in this embodiment again.

The following describes in detail how to determine the target geographical position of the mobile user in this embodiment.

In step 101, the user equipment first determines the occurrence probability of the current behavioral activity of the mobile user, which may be implemented in the following possible implementation manners:

One possible implementation manner is to acquire a current geographical position and current time of the mobile user, determine, according to the current geographical position, distribution of a point of interest that is of the mobile user and within a second preset geographical position range, and determine the occurrence probability of the current behavioral activity of the mobile user according to the current time and the distribution of the point of interest.

Behavioral activities of the mobile user in daily life are dining, working, shopping, and the like, and it is assumed that there are M kinds of behavioral activities, where M is a natural number. Each behavioral activity is corresponding to one point of interest (POI), and the point of interest may be a restaurant, a mall, an office building, and the like, where it is assumed that there are N kinds of points of interest, and N is a natural number.

Particularly, there is a correspondence between the current time, each of the point of interest, and an occurrence sub-probability of the current behavioral activity. The correspondence may be indicated using a condition occurrence probability $p(Act_i|POI_k,T)$, where $Act_i$ represents the occurrence sub-probability of the current behavioral activity of the mobile user, $POI_k$ represents the point of interest, and T represents the current time, which may be shown in table 1, where the occurrence sub-probability of the current behavioral activity of the mobile user may be an empirical value given by an expert, or may be acquired by means of statistics according to collected multiple historical activity records of the mobile user.

TABLE 1

| Time period | POI type | Dining | Working | Shopping |
|---|---|---|---|---|
| 8:00-11:30 | Restaurant | 0.5 | 0.5 | 0 |
| | Mall | 0.3 | 0.1 | 0.6 |
| | Office building | 0.05 | 0.9 | 0.05 |
| 11:30-13:30 | Restaurant | 0.7 | 0.3 | 0 |
| | Mall | 0.4 | 0.1 | 0.5 |
| | Office building | 0.1 | 0.85 | 0.05 |
| ... | ... | ... | ... | ... |

When the current time is in the time period from 8:00 to 11:30, as shown in table 1, when the point of interest is the office building, an occurrence sub-probability that the current behavioral activity of the mobile user is dining is 0.05, an occurrence sub-probability of working is 0.9, and an occurrence sub-probability of shopping is 0.05.

Because many points of interest exist in the second preset geographical position range that is relative to the current geographical position of the mobile user, a ratio of the point of interest is determined according to the distribution of the point of interest, and the occurrence probability of the current behavioral activity of the mobile user at the current time is determined according to the ratio of the point of interest, and an occurrence sub-probability of the current behavioral activity corresponding to each of the point of interest.

All the points of interest in the second preset geographical position range are obtained by searching according to coordinates of the current geographical position of the mobile user, and relative to all the points of interest, occurrence sub-probabilities of the same current behavioral activity are summed to obtain the occurrence probability of the current behavioral activity in the current geographical position, as shown in formula 1:

$$p(Act_i \mid Loc, T) = \sum_{k=1}^{N} p_k \cdot p(Act_i \mid POI_k, T) \qquad \text{(Formula 1)}$$

$Act_i$ represents the occurrence sub-probability of the current behavioral activity of the mobile user, $POI_k$ represents the point of interest, T represents the current time, Loc represents the current geographical position, and N represents a quantity of points of interest. $P_k$ is a ratio of a quantity of points of interest that are of a same type to all the points of interest, where $p_k$ ($0 \leq p_k \leq 1$). For example, when the point of interest is restaurant, $P_k$ is 0.4, when the point of interest is mall, $P_k$ is 0.3, and when the point of interest is office building, $P_k$ is 0.3.

When the current time is in the time period from 8:00 to 11:30, and the current behavioral activity is dining, the occurrence probability of the current behavioral activity is P=0.4×0.5+0.3×0.3+0.3×0.05=0.305, when the current behavioral activity is working, the occurrence probability of the current behavioral activity is P=0.4×0.5+0.3×0.1+0.3×0.9=0.5, and when the current behavioral activity is shopping, the occurrence probability of the current behavioral activity is P=0.4×0+0.3×0.6+0.3×0.05=0.195.

Another possible implementation manner is to acquire sense data corresponding to the mobile user, determine a motion state of the mobile user according to the sense data, and determine the occurrence probability of the current behavioral activity of the mobile user according to the motion state of the mobile user.

The motion state (motionless, walking, riding) of the mobile user is determined using a motion sensor (such as an acceleration sensor or a gyroscope) on the user equipment, or it is determined, using a light sensor, a barometer, and a Global Position System (GPS), whether the current geographical position of the mobile user is indoor/outdoor. The motion state of the mobile user is determined by comprehensively applying the foregoing various types of sense data and by means of occurrence probability reasoning, rule reasoning and the like, and the occurrence probability of the current behavioral activity of the mobile user is determined according to the motion state of the mobile user. A person skilled in the art may understand that there is a correspondence between the motion state and the occurrence probability of the current behavioral activity of the mobile user, and the occurrence probability of the current behavioral activity may be determined according to the correspondence.

Still another possible implementation manner is to acquire a background voice of the current geographical position of the mobile user, and determine the occurrence probability of the current behavioral activity of the mobile user according to the background voice.

The background voice of the mobile user is collected using a microphone of the user equipment, and a special sound is identified or a scenario analysis is performed by preprocessing data of the background voice and extracting a Mel frequency cepstrum coefficient (MFCC), a zero-crossing rate, short-time energy, and the like. Therefore, an activity of the mobile user may be speculated according to the background voice. If an impact sound of tableware appears in the background voice, the current behavioral activity of the mobile user is determined as dining, and if there is a sound that multiple people are having a discussion at the same time, the current behavioral activity of the mobile user is determined as a meeting. A person skilled in the art may understand that there is a correspondence between the background voice and the occurrence probability of the current behavioral activity of the mobile user, and the occurrence probability of the current behavioral activity may be determined according to the correspondence.

In step 102, the occurrence probability of the target behavioral activity of the mobile user is determined according to the occurrence probability of the current behavioral activity of the mobile user, the historical activity migration rule of the mobile user, and the public activity migration rule, where the historical activity migration rule includes an occurrence probability, determined according to a historical behavioral activity of the mobile user, that the mobile user is converted from the current behavioral activity to the target behavioral activity, and a weighting factor of the historical behavioral activity, and the public activity migration rule includes an occurrence probability, determined according to a historical behavioral activity of another mobile user, that the mobile user is converted from the current behavioral activity to the target behavioral activity, and a weighting factor of a public behavioral activity.

Detailed description is provided in the following using a specific embodiment.

First, according to a universal public activity migration rule of mobile users, the occurrence probability $p^{common}(Act_i \mid Act_{i-1})$ that the mobile user is converted from the current behavioral activity to the target behavioral activity is obtained, as shown in table 2. The public activity migration rule may be an empirical value given by an expert, or may be acquired by means of statistics according to collected historical activity records of multiple mobile users.

TABLE 2

| Current behavioral activity | Target behavioral activity | | |
|---|---|---|---|
| | Dining | Working | Shopping |
| Dining | 0 | 0.6 | 0.4 |
| Working | 0.8 | 0 | 0.2 |
| Shopping | 0.9 | 0.1 | 0 |

In addition, if the historical activity migration rule is known, the occurrence probability $p^{personal}(Act_i|Act_{i-1})$ that the mobile user is converted from the current behavioral activity to the target behavioral activity may also be obtained, where the historical activity migration rule may be obtained through multiple ways, for example, data may be collected by specially developing software that makes the mobile user actively cooperate to annotate the current behavioral activity, or may be obtained using a check-in service in a third-party location based service (LBS) that is once used by the mobile user, or may be extracted from a recorded electronic diary of the mobile user, and a schedule in a calendar. A person skilled in the art may understand that the historical activity migration rule may also be shown as Table 2, and details are not described in this embodiment again.

Then, determining an occurrence probability of a target behavioral activity corresponding to the historical behavioral activity according to the occurrence probability of the current behavioral activity, the occurrence probability, determined according to the historical behavioral activity of the mobile user, that the mobile user is converted from the current behavioral activity to the target behavioral activity, and the weighting factor of the historical behavioral activity may be implemented using the following formula:

$$P_l(Act_{next} = act) = \alpha(t) \cdot \sum_{i=1}^{M} p(Act_{current} = b_i) \cdot p^{personal}(Act_{next} = act | Act_{current} = b_i) \quad \text{(Formula 2)}$$

where, $p_l(Act_{next}=act)$ represents the occurrence probability of the target behavioral activity corresponding to the historical behavioral activity, $\alpha(t)$ represents the weighting factor of the historical behavioral activity, $p^{personal}(Act_{next}=act|Act_{current}=b_i)$ represents the occurrence probability, determined according to the historical behavioral activity of the mobile user, that the mobile user is converted from the current behavioral activity to the target behavioral activity, and $p(Act_{current}=b_i)$ represents the occurrence probability of the current behavioral activity, M represents a quantity of behavioral activities, and M is a natural number.

For example, in a possible implementation manner in step 101, when the current behavioral activity is determined as dining, the occurrence probability is 0.305, when the current behavioral activity is working, the occurrence probability is 0.5, and when the current behavioral activity is shopping, the occurrence probability is 0.195.

If $\alpha(t)=0.6$, and the historical activity migration rule is also shown as Table 2, when the target behavioral activity corresponding to the historical behavioral activity is shopping, the occurrence probability is $p_l(Act_{next}=act)=0.6\times(0.305\times0.4+0.5\times0.2+0.195\times0)=0.1332$, when the target behavioral activity corresponding to the historical behavioral activity is dining, the occurrence probability is $p_l(Act_{next}=act)=0.6\times(0.305\times0+0.5\times0.8+0.195\times0.9)=0.3453$, and when the target behavioral activity corresponding to the historical behavioral activity is working, the occurrence probability is $p_l(Ac_{next}=act)=0.6\times(0.305\times0.6+0.5\times0+0.195\times0.1)=0.2025$.

In addition, determining an occurrence probability of a target behavioral activity corresponding to the public behavioral activity according to the occurrence probability of the current behavioral activity, the occurrence probability, determined according to the historical behavioral activity of the other mobile user, that the mobile user is converted from the current behavioral activity to the target behavioral activity, and the weighting factor of the public behavioral activity may be implemented using the following formula:

$$P_g(Act_{next} = act) = (1 - \alpha(t)) \cdot \sum_{i=1}^{M} p(Act_{current} = b_i) \cdot p^{common}(Act_{next} = act | Act_{current} = b_i) \quad \text{(Formula 3)}$$

where, $p_g(Act_{next}=act)$ represents the occurrence probability of the target behavioral activity corresponding to the public behavioral activity, $(1-\alpha(t))$ represents the weighting factor of the public behavioral activity, $p^{common}(Act_{next}=act|Act_{current}=b_i)$ represents the occurrence probability, determined according to the historical behavioral activity of the other mobile user, that the mobile user is converted from the current behavioral activity to the target behavioral activity, M represents a quantity of behavioral activities, and M is a natural number.

In a specific implementation process, for an implementation manner of determining the occurrence probability of the target behavioral activity corresponding to the public behavioral activity, reference may be made to an implementation manner of determining the occurrence probability of the target behavioral activity corresponding to the historical behavioral activity, and details are not described herein again.

A person skilled in the art may understand that $\alpha(t)$ is the weighting factor, and $\alpha(t)$ increases with time, because as time goes by, collected information about a user activity rule continuously increases, and a personal activity rule may gradually play a leading role in a prediction.

Finally, the occurrence probability of the target behavioral activity of the mobile user is determined according to the occurrence probability of the target behavioral activity corresponding to the historical behavioral activity and the occurrence probability of the target behavioral activity corresponding to the public behavioral activity.

In a specific implementation process, the occurrence probability of the target behavioral activity corresponding to the historical behavioral activity and the occurrence probability of the target behavioral activity corresponding to the public behavioral activity are summed in a case in which a same current behavioral activity is converted into a same target behavioral activity such that the occurrence probability $P(Act_{next}=act)$ of the target behavioral activity of the mobile user is obtained, that is, $$p(Act_{next}=act)=P_l(Act_{next}=act)+P_g(Act_{next}=act) \quad \text{(Formula 4)}$$

In step 103, the target behavioral activity of the mobile user is determined according to the occurrence probability of the target behavioral activity of the mobile user.

A target behavioral activity with a maximum occurrence probability is selected as the target behavioral activity.

In step 104: the target geographical position of the mobile user is predicted according to the target behavioral activity of the mobile user.

It is determined whether the target behavioral activity of the mobile user exists in a historical behavioral activity record of the mobile user, where the historical behavioral activity record includes a historical geographical position corresponding to the target behavioral activity, if the target behavioral activity of the mobile user exists in the historical behavioral activity record of the mobile user, the target geographical position of the mobile user is predicted according to the historical behavioral activity record, and if the target behavioral activity of the mobile user does not exist in the historical behavioral activity record of the mobile user, the target geographical position of the mobile user is predicted according to a geographical position that is within a first preset geographical position range and corresponding to the target behavioral activity.

In a specific implementation process, the historical behavioral activity record includes a historical geographical position that is once visited by the mobile user. When the target behavioral activity exists in the historical behavioral activity record, the target geographical position of the mobile user is predicted according to the historical geographical position that is once visited by the mobile user, that is, $$Loc_{next} = \underset{loc_i}{\operatorname{argmax}}\, Num^{personal}(Act_{next}, loc_i) \quad \text{(Formula 5)}$$

where, next $Num^{personal}(Act_{next}, loc_i)$ indicates a quantity of times that an activity $Act_{next}$ happens in a position $loc_i$ in the historical behavioral activity record, and $$\underset{loc_i}{\operatorname{argmax}}$$

represents selecting $loc_i$ that maximizes $Num^{personal}(Act_{next}, loc_i)$.

When the target behavioral activity does not exist in the historical behavioral activity record, the target geographical position may be a geographical position that is within the first preset geographical position range and corresponding to the target behavioral activity, and a probability that the target geographical position is locx is related to a distance between the target geographical position locx and a current geographical position, and a quantity of times that another mobile user undertakes the target behavioral activity $Act_{next}$ in the target geographical position locx, that is, $$p(Loc_{next} = loc_x) = \quad \text{(Formula 6)}$$
$$\underset{loc_i}{\operatorname{argmax}} \Psi(dist(Loc_{next}, loc_x), Num^{common}(Act_{next}, loc_x))$$

where, $\psi(.)$ decreases with the increase of $dist(Loc_{next}, loc_x)$ and increases with the increase of $Num^{common}(Act_{next}, loc_x)$, $dist(Loc_{next}, loc_x)$ indicates a distance between locx and a current position, $Num^{common}(Act^{next}, loc_x)$ indicates the quantity of times that the other mobile user undertakes the target behavioral activity $Act_{next}$ in locx, and $$\underset{loc_i}{\operatorname{argmax}}$$

represents selecting locx that maximizes $\psi(dist(Loc_{next}, loc_x), Num^{common}(Act_{next}, loc_x))$ Particularly, there is no limitation on a specific form of $\psi(.)$, which may be $$\underset{loc_i}{\operatorname{argmax}} \Psi(dist(Loc_{next}, loc_x), Num^{common}(Act_{next}, loc_x)) = \quad \text{(Formula 7)}$$
$$\frac{Num^{common}(Act_{next}, loc_x)}{dist(Loc_{next}, loc_x)},$$

or may be $$\underset{loc_i}{\operatorname{argmax}} \Psi(dist(Loc_{next}, loc_x), Num^{common}(Act_{next}, loc_x)) = \quad \text{(Formula 8)}$$
$$\beta \cdot Rank_{near}(dist(Loc_{next}, loc_x)) +$$
$$(1-\beta) Rank_{freq}(Num^{common}(Act_{next}, loc_x))$$

where, $Rank_{near}(.)$ indicates a ranking of distances between locx and current positions in ascending order, $Rank_{freq}$ indicates a ranking of times that other mobile users undertake the target behavioral activity $Act_{next}$ in locx in descending order, and $\beta \in (0,1)$ is the weighting factor.

Finally, a target geographical position with a maximum probability is selected as the target geographical position of the mobile user.

According to the present disclosure, user equipment determines an occurrence probability of a current behavioral activity of a mobile user, determines an occurrence probability of a target behavioral activity of the mobile user according to the occurrence probability of the current behavioral activity of the mobile user, a historical activity migration rule of the mobile user, and a public activity migration rule, determines the target behavioral activity of the mobile user according to the occurrence probability of the target behavioral activity of the mobile user, and predicts a target geographical position of the mobile user according to the determined target behavioral activity of the mobile user. In the present disclosure, in a case in which there is no large number of historical activity migration rules of the mobile user, the target geographical position of the mobile user is determined using the public activity migration rule, which improves accuracy of the target geographical position. In addition, in this embodiment, a geographical position that does not appear in the historical activity migration rule of the mobile user may further be predicted using the public activity migration rule in order to obtain the target geographical position, thereby improving universal applicability of the method for predicting a position of a mobile user.

Figure 2:
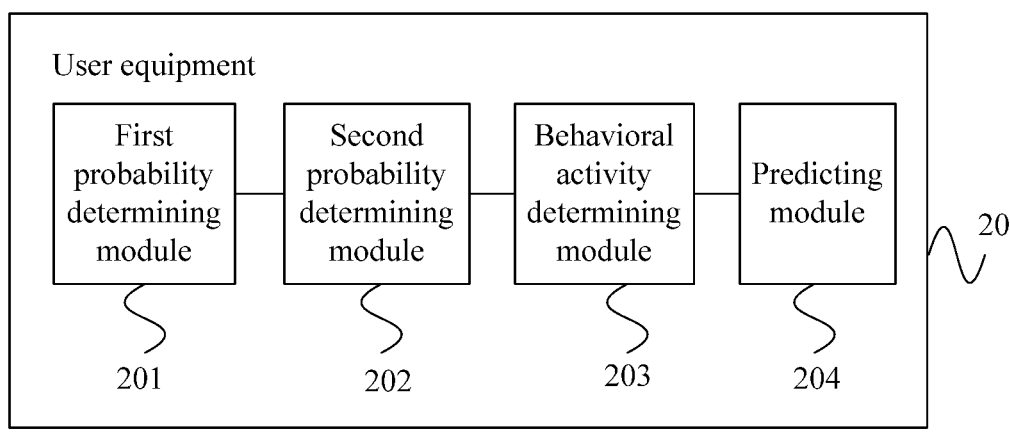
FIG. 2 is a schematic structural diagram of Embodiment 1 of user equipment according to the present disclosure.

FIG. 2 is a schematic structural diagram of Embodiment 1 of user equipment according to the present disclosure. As shown in FIG. 2, the user equipment 20 provided in this embodiment of the present disclosure includes a first probability determining module 201, a second probability determining module 202, a behavioral activity determining module 203, and a predicting module 204, where the first probability determining module 201 is configured to determine an occurrence probability of a current behavioral activity of a mobile user, the second probability determining module 202 is configured to determine an occurrence probability of a target behavioral activity of the mobile user according to the occurrence probability of the current behavioral activity of the mobile user, a historical activity migration rule of the mobile user, and a public activity migration rule, the behavioral activity determining module 203 is configured to determine the target behavioral activity of the mobile user according to the occurrence probability of the target behavioral activity of the mobile user, and the predicting module 204 is configured to predict a target geographical position of the mobile user according to the determined target behavioral activity of the mobile user.

The user equipment provided in this embodiment may be used to perform a technical solution of a method for predicting a position of a mobile user provided in any embodiment of the present disclosure, and implementation principles and technical effects thereof are similar and are not described herein again.

Optionally, the historical activity migration rule includes an occurrence probability, determined according to a historical behavioral activity of the mobile user, that the mobile user is converted from the current behavioral activity to the target behavioral activity, and a weighting factor of the historical behavioral activity, and the public activity migration rule includes an occurrence probability, determined according to a historical behavioral activity of another mobile user, that the mobile user is converted from the current behavioral activity to the target behavioral activity, and a weighting factor of a public behavioral activity.

Optionally, the second probability determining module 202 is configured to determine an occurrence probability of a target behavioral activity corresponding to the historical behavioral activity according to the occurrence probability of the current behavioral activity, the occurrence probability, determined according to the historical behavioral activity of the mobile user, that the mobile user is converted from the current behavioral activity to the target behavioral activity, and the weighting factor of the historical behavioral activity, determine an occurrence probability of a target behavioral activity corresponding to the public behavioral activity according to the occurrence probability of the current behavioral activity, the occurrence probability, determined according to the historical behavioral activity of the other mobile user, that the mobile user is converted from the current behavioral activity to the target behavioral activity, and the weighting factor of the public behavioral activity, and determine the occurrence probability of the target behavioral activity of the mobile user according to the occurrence probability of the target behavioral activity corresponding to the historical behavioral activity and the occurrence probability of the target behavioral activity corresponding to the public behavioral activity.

Optionally, the predicting module 204 is configured to determine whether the target behavioral activity of the mobile user exists in a historical behavioral activity record of the mobile user, where the historical behavioral activity record includes a historical geographical position corresponding to the target behavioral activity, if the target behavioral activity of the mobile user exists in the historical behavioral activity record of the mobile user, predict the target geographical position of the mobile user according to the historical behavioral activity record, and if the target behavioral activity of the mobile user does not exist in the historical behavioral activity record of the mobile user, predict the target geographical position of the mobile user according to a geographical position that is within a first preset geographical position range and corresponding to the target behavioral activity.

Optionally, the first probability determining module 201 is configured to acquire a current geographical position and current time of the mobile user, determine, according to the current geographical position, distribution of a point of interest that is of the mobile user and within a second preset geographical position range, and determine the occurrence probability of the current behavioral activity of the mobile user according to the current time and the distribution of the point of interest, or acquire sense data corresponding to the mobile user, determine a motion state of the mobile user according to the sense data, and determine the occurrence probability of the current behavioral activity of the mobile user according to the motion state of the mobile user, or acquire a background voice of a current geographical position of the mobile user, and determine the occurrence probability of the current behavioral activity of the mobile user according to the background voice.

Optionally, there is a correspondence between the current time, each of the point of interest, and an occurrence sub-probability of the current behavioral activity.

The first probability determining module 201 is further configured to determine a ratio of each of the point of interest according to the distribution of the point of interest, and determine the occurrence probability of the current behavioral activity of the mobile user at the current time according to the ratio of each of the point of interest, and an occurrence sub-probability of the current behavioral activity corresponding to each of the point of interest.

The user equipment provided in this embodiment may be used to perform a technical solution of a method for predicting a position of a mobile user provided in any embodiment of the present disclosure, and implementation principles and technical effects thereof are similar and are not described herein again.

Figure 3:
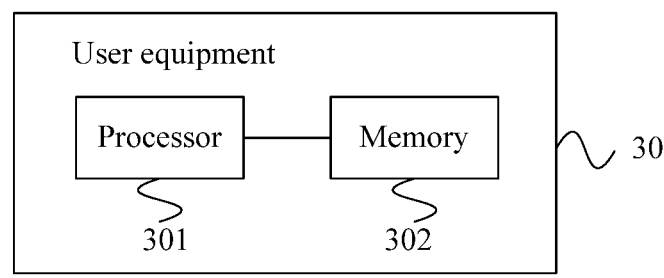
FIG. 3 is a schematic structural diagram of Embodiment 2 of user equipment according to the present disclosure.

FIG. 3 is a schematic structural diagram of Embodiment 2 of user equipment according to the present disclosure. As shown in FIG. 3, the user equipment 30 provided in this embodiment includes a processor 301 and a memory 302. Optionally, the user equipment 30 may further include a transmitter and a receiver. The transmitter and the receiver may be connected to the processor 301, where the transmitter is configured to send data or information, the receiver is configured to receive data or information, and the memory 302 stores execution instructions, when the user equipment 30 runs, the processor 301 communicates with the memory 302, and the processor 301 invokes the execution instructions in the memory 302 to perform the following operations determining an occurrence probability of a current behavioral activity of a mobile user, determining an occurrence probability of a target behavioral activity of the mobile user according to the occurrence probability of the current behavioral activity of the mobile user, a historical activity migration rule of the mobile user, and a public activity migration rule, determining the target behavioral activity of the mobile user according to the occurrence probability of the target behavioral activity of the mobile user, and predicting a target geographical position of the mobile user according to the determined target behavioral activity of the mobile user.

The user equipment provided in this embodiment may be used to perform a technical solution of a method for predicting a position of a mobile user provided in any embodiment of the present disclosure, and implementation principles and technical effects thereof are similar and are not described herein again.

Optionally, the historical activity migration rule includes an occurrence probability, determined according to a historical behavioral activity of the mobile user, that the mobile user is converted from the current behavioral activity to the target behavioral activity, and a weighting factor of the historical behavioral activity, and the public activity migration rule includes an occurrence probability, determined according to a historical behavioral activity of another mobile user, that the mobile user is converted from the current behavioral activity to the target behavioral activity, and a weighting factor of a public behavioral activity.

Optionally, the determining an occurrence probability of a target behavioral activity of the mobile user according to the occurrence probability of the current behavioral activity of the mobile user, a historical activity migration rule of the mobile user, and a public activity migration rule includes determining an occurrence probability of a target behavioral activity corresponding to the historical behavioral activity according to the occurrence probability of the current behavioral activity, the occurrence probability, determined according to the historical behavioral activity of the mobile user, that the mobile user is converted from the current behavioral activity to the target behavioral activity, and the weighting factor of the historical behavioral activity, determining an occurrence probability of a target behavioral activity corresponding to the public behavioral activity according to the occurrence probability of the current behavioral activity, the occurrence probability, determined according to the historical behavioral activity of the other mobile user, that the mobile user is converted from the current behavioral activity to the target behavioral activity, and the weighting factor of the public behavioral activity, and determining the occurrence probability of the target behavioral activity of the mobile user according to the occurrence probability of the target behavioral activity corresponding to the historical behavioral activity and the occurrence probability of the target behavioral activity corresponding to the public behavioral activity.

Optionally, the predicting a target geographical position of the mobile user according to the determined target behavioral activity of the mobile user includes determining whether the target behavioral activity of the mobile user exists in a historical behavioral activity record of the mobile user, where the historical behavioral activity record includes a historical geographical position corresponding to the target behavioral activity, if the target behavioral activity of the mobile user exists in the historical behavioral activity record of the mobile user, predicting the target geographical position of the mobile user according to the historical behavioral activity record, and if the target behavioral activity of the mobile user does not exist in the historical behavioral activity record of the mobile user, predicting the target geographical position of the mobile user according to a geographical position that is within a first preset geographical position range and corresponding to the target behavioral activity.

Optionally, the determining an occurrence probability of a current behavioral activity of a mobile user includes acquiring a current geographical position and current time of the mobile user, determining, according to the current geographical position, distribution of a point of interest that is of the mobile user and within a second preset geographical position range, and determining the occurrence probability of the current behavioral activity of the mobile user according to the current time and the distribution of the point of interest, or acquiring sense data corresponding to the mobile user, determining a motion state of the mobile user according to the sense data, and determining the occurrence probability of the current behavioral activity of the mobile user according to the motion state of the mobile user, or acquiring a background voice of a current geographical position of the mobile user, and determining the occurrence probability of the current behavioral activity of the mobile user according to the background voice.

Optionally, there is a correspondence between the current time, each of the point of interest, and an occurrence sub-probability of the current behavioral activity.

The determining the occurrence probability of the current behavioral activity of the mobile user according to the current time and the distribution of the point of interest includes determining a ratio of each of the point of interest according to the distribution of the point of interest, and determining the occurrence probability of the current behavioral activity of the mobile user at the current time according to the ratio of each of the point of interest, and an occurrence sub-probability of the current behavioral activity corresponding to each of the point of interest.

The user equipment provided in this embodiment may be used to perform a technical solution of a method for predicting a position of a mobile user provided in any embodiment of the present disclosure, and implementation principles and technical effects thereof are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that stores program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for predicting a position of a mobile user, comprising:

determining a first occurrence probability of a current behavioral activity of a mobile user;

determining a second occurrence probability of a first target behavioral activity of the mobile user according to the first occurrence probability of the current behavioral activity of the mobile user, a historical activity migration rule of the mobile user, and a public activity migration rule, wherein the historical activity migration rule comprises a third occurrence probability, determined according to a first historical behavioral activity of the mobile user, that the mobile user is converted from the current behavioral activity to the first target behavioral activity, and a first weighting factor of the first historical behavioral activity, and wherein the public activity migration rule comprises a fourth occurrence probability, determined according to a second historical behavioral activity of another mobile user, that the mobile user is converted from the current behavioral activity to the first target behavioral activity, and a second weighting factor of a public behavioral activity;

determining the first target behavioral activity of the mobile user according to the second occurrence probability of the first target behavioral activity of the mobile user; and predicting a target geographical position of the mobile user according to the determined first target behavioral activity of the mobile user.

2. The method according to claim 1, wherein determining the second occurrence probability of the first target behavioral activity of the mobile user according to the first occurrence probability of the current behavioral activity of the mobile user, the historical activity migration rule of the mobile user, and the public activity migration rule comprises:

determining a fifth occurrence probability of a second target behavioral activity corresponding to the first historical behavioral activity according to the first occurrence probability of the current behavioral activity, the third occurrence probability, determined according to the first historical behavioral activity of the mobile user, that the mobile user is converted from the current behavioral activity to the first target behavioral activity, and the first weighting factor of the first historical behavioral activity;

determining a sixth occurrence probability of a third target behavioral activity corresponding to the public behavioral activity according to the first occurrence probability of the current behavioral activity, the fourth occurrence probability, determined according to the second historical behavioral activity of the other mobile user, that the mobile user is converted from the current behavioral activity to the first target behavioral activity, and the second weighting factor of the public behavioral activity; and determining the second occurrence probability of the first target behavioral activity of the mobile user according to the fifth occurrence probability of the second target behavioral activity corresponding to the first historical behavioral activity and the sixth occurrence probability of the third target behavioral activity corresponding to the public behavioral activity.

3. The method according to claim 1, wherein predicting the target geographical position of the mobile user according to the determined first target behavioral activity of the mobile user comprises:

determining whether the first target behavioral activity of the mobile user exists in a historical behavioral activity record of the mobile user, wherein the historical behavioral activity record comprises a historical geographical position corresponding to the first target behavioral activity;

predicting the target geographical position of the mobile user according to the historical behavioral activity record when the first target behavioral activity of the mobile user exists in the historical behavioral activity record of the mobile user; and predicting the target geographical position of the mobile user according to a candidate geographical position that is within a first preset geographical position range and corresponding to the first target behavioral activity when first the target behavioral activity of the mobile user does not exist in the historical behavioral activity record of the mobile user.

4. The method according to claim 1, wherein determining the first occurrence probability of the current behavioral activity of the mobile user comprises:

acquiring a current geographical position and current time of the mobile user;

determining, according to the current geographical position, distribution of a point of interest that is of the mobile user and within a second preset geographical position range; and determining the first occurrence probability of the current behavioral activity of the mobile user according to the current time and the distribution of the point of interest.

5. The method according to claim 4, wherein there is a correspondence between the current time, each of the point of interest, and an occurrence sub-probability of the current behavioral activity, and wherein the determining of the first occurrence probability of the current behavioral activity of the mobile user according to the current time and the distribution of the point of interest comprises:

determining a ratio of each of the point of interest according to the distribution of the point of interest; and determining the first occurrence probability of the current behavioral activity of the mobile user at the current time according to the ratio of each of the point of interest, and an occurrence sub-probability of the current behavioral activity corresponding to each of the point of interest.

6. The method according to claim 1, wherein determining the first occurrence probability of the current behavioral activity of the mobile user comprises:

acquiring sense data corresponding to the mobile user, determining a motion state of the mobile user according to the sense data; and determining the first occurrence probability of the current behavioral activity of the mobile user according to the motion state of the mobile user.

7. The method according to claim 1, wherein determining the first occurrence probability of the current behavioral activity of the mobile user comprises:

acquiring a background voice of a current geographical position of the mobile user, and determining the first occurrence probability of the current behavioral activity of the mobile user according to the background voice.

8. A user equipment, comprising:

a memory configured to store instructions; and a processor coupled to the memory and configured to execute the instructions to:

determine a first occurrence probability of a current behavioral activity of a mobile user;

determine a second occurrence probability of a first target behavioral activity of the mobile user according to the first occurrence probability of the current behavioral activity of the mobile user, a historical activity migration rule of the mobile user, and a public activity migration rule, wherein the historical activity migration rule comprises a third occurrence probability, determined according to a first historical behavioral activity of the mobile user, that the mobile user is converted from the current behavioral activity to the first target behavioral activity, and a first weighting factor of the first historical behavioral activity, and wherein the public activity migration rule comprises a fourth occurrence probability, determined according to a second historical behavioral activity of another mobile user, that the mobile user is converted from the current behavioral activity to the first target behavioral activity, and a second weighting factor of a public behavioral activity;

determine the first target behavioral activity of the mobile user according to the second occurrence probability of the first target behavioral activity of the mobile user; and predict a target geographical position of the mobile user according to the determined first target behavioral activity of the mobile user.

9. The user equipment according to claim 8, wherein the processor is further configured to execute the instructions to:

determine a fifth occurrence probability of a second target behavioral activity corresponding to the first historical behavioral activity according to the first occurrence probability of the current behavioral activity, the third occurrence probability, determined according to the first historical behavioral activity of the mobile user, that the mobile user is converted from the current behavioral activity to the first target behavioral activity, and the first weighting factor of the first historical behavioral activity;

determine a sixth occurrence probability of a third target behavioral activity corresponding to the public behavioral activity according to the first occurrence probability of the current behavioral activity, the fourth occurrence probability, determined according to the second historical behavioral activity of the other mobile user, that the mobile user is converted from the current behavioral activity to the first target behavioral activity, and the second weighting factor of the public behavioral activity; and determine the second occurrence probability of the first target behavioral activity of the mobile user according to the fifth occurrence probability of the second target behavioral activity corresponding to the first historical behavioral activity and the sixth occurrence probability of the third target behavioral activity corresponding to the public behavioral activity.

10. The user equipment according to claim 8, wherein the processor is further configured to execute the instructions to:

determine whether the first target behavioral activity of the mobile user exists in a historical behavioral activity record of the mobile user, wherein the historical behavioral activity record comprises a historical geographical position corresponding to the first target behavioral activity;

predict the target geographical position of the mobile user according to the historical behavioral activity record when the first target behavioral activity of the mobile user exists in the historical behavioral activity record of the mobile user; and predict the target geographical position of the mobile user according to a candidate geographical position that is within a first preset geographical position range and corresponding to the first target behavioral activity when the first target behavioral activity of the mobile user does not exist in the historical behavioral activity record of the mobile user.

11. The user equipment according to claim 8, wherein the processor is further configured to execute the instructions to:

acquire a current geographical position and current time of the mobile user;

determine, according to the current geographical position, distribution of a point of interest that is of the mobile user and within a second preset geographical position range; and determine the first occurrence probability of the current behavioral activity of the mobile user according to the current time and the distribution of the point of interest.

12. The user equipment according to claim 11, wherein there is a correspondence between the current time, each of the point of interest, and an occurrence sub-probability of the current behavioral activity, and wherein the processor is further configured to execute the instructions to:

determine a ratio of each of the point of interest according to the distribution of the point of interest; and determine the first occurrence probability of the current behavioral activity of the mobile user at the current time according to the ratio of each of the point of interest, and an occurrence sub-probability of the current behavioral activity corresponding to each of the point of interest.

13. The user equipment according to claim 8, wherein the processor is further configured to execute the instructions to:

acquire sense data corresponding to the mobile user;

determine a motion state of the mobile user according to the sense data; and determine the first occurrence probability of the current behavioral activity of the mobile user according to the motion state of the mobile user.

14. The user equipment according to claim 8, wherein the processor is further configured to execute the instructions to:

acquire a background voice of a current geographical position of the mobile user, and determine the first occurrence probability of the current behavioral activity of the mobile user according to the background voice.

15. A computer program product, comprising computer executable instructions stored on a non-transitory computer-readable medium, wherein when the instructions are executed by a processor, causes the processor to:

determine a first occurrence probability of a current behavioral activity of a mobile user;

determine a second occurrence probability of a first target behavioral activity of the mobile user according to the first occurrence probability of the current behavioral activity of the mobile user, a historical activity migration rule of the mobile user, and a public activity migration rule, wherein the historical activity migration rule comprises a third occurrence probability, determined according to a first historical behavioral activity of the mobile user, that the mobile user is converted from the current behavioral activity to the first target behavioral activity, and a first weighting factor of the first historical behavioral activity and wherein the public activity migration rule comprises a fourth occurrence probability, determined according to a second historical behavioral activity of another mobile user, that the mobile user is converted from the current behavioral activity to the first target behavioral activity, and a second weighting factor of a public behavioral activity;

determine the first target behavioral activity of the mobile user according to the second occurrence probability of the first target behavioral activity of the mobile user; and predict a target geographical position of the mobile user according to the determined first target behavioral activity of the mobile user.

16. The computer program product according to claim 15, wherein the instructions further cause the processor to:

determine a fifth occurrence probability of a second target behavioral activity corresponding to the first historical behavioral activity according to the first occurrence probability of the current behavioral activity, the third occurrence probability, determined according to the first historical behavioral activity of the mobile user, that the mobile user is converted from the current behavioral activity to the first target behavioral activity, and the first weighting factor of the first historical behavioral activity;

determine a sixth occurrence probability of a third target behavioral activity corresponding to the public behavioral activity according to the first occurrence probability of the current behavioral activity, the fourth occurrence probability, determined according to the second historical behavioral activity of the other mobile user, that the mobile user is converted from the current behavioral activity to the first target behavioral activity, and the second weighting factor of the public behavioral activity; and determine the second occurrence probability of the first target behavioral activity of the mobile user according to the fifth occurrence probability of the second target behavioral activity corresponding to the first historical behavioral activity and the sixth occurrence probability of the third target behavioral activity corresponding to the public behavioral activity.

17. The computer program product according to claim 16, wherein the instructions further cause the processor to:

determine whether the first target behavioral activity of the mobile user exists in a historical behavioral activity record of the mobile user, wherein the historical behavioral activity record comprises a historical geographical position corresponding to the first target behavioral activity;

predict the target geographical position of the mobile user according to the historical behavioral activity record when the first target behavioral activity of the mobile user exists in the historical behavioral activity record of the mobile user; and predict the target geographical position of the mobile user according to a candidate geographical position that is within a first preset geographical position range and corresponding to the first target behavioral activity when the first target behavioral activity of the mobile user does not exist in the historical behavioral activity record of the mobile user.

* * * * *